United States Patent [19]

Scranton et al.

[11] 4,396,966
[45] Aug. 2, 1983

[54] LOW MASS ACTUATOR SYSTEM FOR MAGNETIC RECORDING DISKS WITH HALF STRENGTH END POLES

[75] Inventors: Robert A. Scranton, Ossining; David A. Thompson, South Salem; Thomas K. Worthington, Tarrytown, all of N.Y.

[73] Assignee: International Business Machines Corporation, Armonk, N.Y.

[21] Appl. No.: 221,866

[22] Filed: Dec. 31, 1980

[51] Int. Cl.³ .................. G11B 21/08; H02K 41/00
[52] U.S. Cl. .................................... 360/106; 310/13
[58] Field of Search ...................... 360/106; 310/13

[56] References Cited
U.S. PATENT DOCUMENTS 4,314,295  2/1982  Frandsen .......................... 360/106
4,322,762  3/1982  Manzke et al. .................... 360/106

*Primary Examiner*—Robert S. Tupper
*Attorney, Agent, or Firm*—Graham S. Jones

[57] ABSTRACT

A linear motor adapted for driving a magnetic recording head reciprocably across the surface of a magnetic recording disk in a disk file has its stator located between the disks. The stator includes parallel magnetic yokes composed of plates extending parallel to the disks. At least one of the plates carries an array of regularly spaced and alternating magnetic pole elements, rigidly secured to one yoke with a gap extending between the yokes including the alternating poles providing a space within which the armature reciprocates, from one magnetic polarity to the opposite a plurality of times per reciprocation of the armature. End poles are provided at each end of the array, which are matched to collect the return flux from the adjacent distal pole to reduce fringing flux which emanates towards the disks and the recording heads.

9 Claims, 6 Drawing Figures

LOW MASS ACTUATOR SYSTEM FOR MAGNETIC RECORDING DISKS WITH HALF STRENGTH END POLES

DESCRIPTION

1. Technical Field

This invention relates to magnetic recording disks systems and more particularly to read/write head actuator systems for such disk systems.

In reading and recording with magnetic recording disk stacks, the speed of seek operations in moving from one random position to another as required by the random requirements of a data processing system is important. Current linear voice coil actuators involve large moving masses. Such large mass actuators are slow. There is a need for a low mass accurate linear actuator having a stroke which traverses the entire recording width of a disk. This invention is directed to minimizing stray magnetic fields in a linear actuator having its stator located between disks in a disk stack for the purpose of maximizing efficiency and reliability of the system.

2. Background Art

In commonly assigned copending United States patent application Ser. No. 221,607 of Garwin et al entitled "Low Mass Actuator Systems for Magnetic Recording Disks" An actuator for a magnetic read/write head carried by a linear motor has its stator located between a pair of disks within a stack of magnetic recordings disks. The stator comprises an array of reversed polarity magnets (preferably permanent) in a linear array. Two flat coils are the drive elements of the armature of the motor with the coils arranged in side-by-side relationship for bridging from magnet to magnet in the stator. Thus the armature will not be stalled between magnets. The actuator is controlled by an electronic control system for selecting any position precisely, rather than in steps as in a stepping motor. A microprocessor can be used to adjust control of the direction of motion of the actuator based upon feedback signals.

United States Pat. No. 3,735,163 of Dijkstra et al entitled "Linear Motor for the Positioning of Magnetic Heads" shows a roller mounted, bulky structure with a very large permanent magnet located to one side of the stack of disks. This arrangement has all of the mechanical problems to be overcome by the type of linear actuator requiring this invention.

United States Pat. No. 4,030,132 of Iftikar et al for a "Dual Mode Velocity Servo Control for a Linear Actuator Motor" shows the conventional voice coil type of actuator for a disk file in its FIG. 1A. A servo control system for that arrangement is described.

In United States Pat. 3,899,699 of Griffing for a "brushless Linear DC Motor Actuator", the stator includes a single very long permanent bar magnet with a north pole along one elongated side near the armature and a south pole along the outer side of the bar magnet. The motor is of an entirely different design from the instant invention.

An IBM Technical Disclosure Bulletin article of Lissner et al (I) dated March 1975, pp. 3016-8, entitled "Disk File Actuator," states upon page 3017, under item (c) that "A shielded magnetic core mounted to ground is cantilevered between the disks. The core has a slit gap 24 in which is suspended the flat rectangular coil 18. The magnetic structure is segmented into discrete magnets 26 a,b with alternating polarity. In the gaps 22 of adjacent magnets lie the two driving legs of the rectangular coil 18."

A similar article by Lissner et al (II) is entitled "Disk File Actuator Design Permits Increased Track Density," Computer Design, February 1979, pp. 116-120.

The overall Lissner et al actuator is a piggyback design with a long stroke conventional voice coil actuator 10 (FIG. 1 of Lissner et al) and a rotary stage which uses a pair of magnets and a flat pivoted coil to provide a rotary motion.

The pivot arm 14 is a rotary motor driven by its flat coil and two permanent magnets with which it cooperates to pivot the head 16 back and forth as shown in FIG. 1 of Lissner et al.

R. K. Oswald, "Design of a Disk File Head Positioning Servo." IBM Journal of Research & Development No. 1974, pp. 506-512, describes a conventional closed loop servo system using an actuator whose properties, e.g. gain force constant, inertia etc. are nominally independent of position. That system is directed to use with a voice coil actuator.

Santana U.S. Pat. No. 3,534,344 for "Method and Apparatus for Recording and Detecting Information" shows another voice coil actuator system.

Disclosure of Invention

A linear actuator for a magnetic recording disk file composed of disks includes a stator and a shuttling armature composed of a pair of flat coils supported on a thin, low mass carriage. The stator includes a number of permanent magnets of opposite magnetic polarity located in an array, side-by-side. At each end of the array of magnets is provided a half strength magnet for closing the magnetic circuit at that end with minimal stray magnetic fields. The coils are energized to interact with the magnets to propel the armature linearly along the array of magnets. The coils are driven alternately by a control system which moves the head to satisfy a position control input signal with the cooperation of feedback of actual head position information from the disk media to a microprocessor which monitors the instantaneous track position and the requested track numbers as described in copending United States patent application Ser. No. 221,607. The coils are used alternately because if an energized coil is centered over a boundary between magnets, even at full current the actuator can be stalled. Thus, for example, if a first coil is at dead center, the second coil must be used to drive the unit off dead center. The microprocessor coordinates such changes. The overall system permits continuous servo control rather than linear stepper motor control. Thus, the head can be held at a desired position by producing currents in the coils in a continuously variable fashion to counter varying disturbances or to accomodate runout or wobble of the disk.

This actuator enables attainment of Direct Access Storage Device (DASD) files with independently controlled actuators per disk surface if desired. Studies of DASD system performance suggests that such an approach can result in significantly shorter average response times at the request rates necessary for DASD files to be used with future processors than those achievable with extensions of present voice coil actuator concepts. An array of such linear actuators is also less expensive than the conventional approach.

This linear motor has advantages in performance (acceleration, size of actuator and hence availability of more heads), cost, and in the possibility of separately controlled heads for each disk surface, rather than ganging the heads for all surfaces on a single drive. The much lower moving mass of this actuator has very substantial advantages in reducing the size of the massive frame now required, in allowing assembly by personnel who cannot lift heavy weights, and the like. It has advantages simultaneously in performance, cost, size, and weight, and minimal problems caused by stray flux interfering with the magnetic recording system.

In summary, a linear motor adapted for driving a magnetic recording head reciprocably across the surface of a magnetic recording disk in a disk file comprising a stack of disks has its stator located between a pair of said disks. The stator includes a pair of parallel magnetic yokes composed of a pair of parallel plates extending parallel to the disks. At least one of the yokes carries an array of regularly spaced and alternating magnetic pole elements, ridigly secured to at least one of the yokes. A gap extends between the yokes including the alternating poles. The gap provides a space within which the armature reciprocates, from one magnetic polarity to the opposite a plurality of times per reciprocation of the armature. Magnetic end poles are provided at each end of the array. When the plurality of magnetic pole elements in the linear motor are uniform magnetically (strength and width for a single material) they tend to cause leakage of the magnetic field at the end of the linear motor. The leakage of the field tends to fringe into the magnetic recording medium, the head, etc. This is unacceptable. However, we have found that adding magnetic half poles sufficient for optimizing flux shielding at the end of the stator reduces the fringing field to a minimum, and it makes the fringing field compatible with a DASD device.

In accordance with this invention, a flat actuator linear motor for a magnetic recording disk uses an array of alternating polarity permanent magnets to propel a double flat coil armature. The flux from one magnet is returned by an adjacent magnet of opposite polarity. Adjacent magnets are of equal size. This invention has the object of solving a problem of the above structure. The problem is that there is an insufficient return path for the magnetic flux from the end magnets in the array. This effect causes the iron pole pieces to saturate in the region near their ends. The result of such saturation is the risk of disk erasure by stray flux emanating from the saturated iron. Recording head problems can be caused as well, as the heads are near the areas which would be saturated. Further, disk head saturation could be caused by excessive stray fields. The inventive structure is characterized by its inclusion at the distal ends of the array of magnets of a set of half size flux gathering magnets of permanent magnetic material (referred to hereinafter as "half poles") having a flux producing capacity matched to collect the return flux from the adjacent ones of the poles on the stator. Thus, fringing magnetic fields extending into the space in which the disk files are located are minimized.

BRIEF DESCRIPTION OF DRAWINGS

FIG. 1 shows a set of linear actuators for moving disk reading heads 3, for a magnetic recording disk stack 1, 1', 1". Each actuator includes a stator 40 including magnetic yokes (not shown for convenience of illustration) and each with an array of alternating polarity magnetic poles 42 and 43, in accordance with the copending Garwin et al application. Each stator 40 extends within the space above or between a pair of the parallel recording disks 1, 1' and 1" mounted on spindle 4. A very light-weight armature including a carriage 46 carrying a head 3 is adapted to move very rapidly. The distributed stator 40 and the light-weight, shuttling carriage 46 of the armature increase the speed and accuracy of positioning because of the reduced weight and mechanical stresses upon the system.

Figure 1:
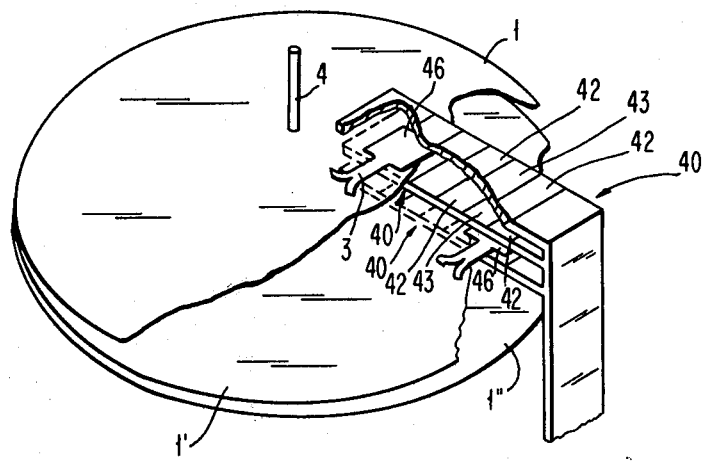
FIG. 1 shows a schematic view of a head actuator for magnetic recording disks adapted to use of this invention.
Figure 2:
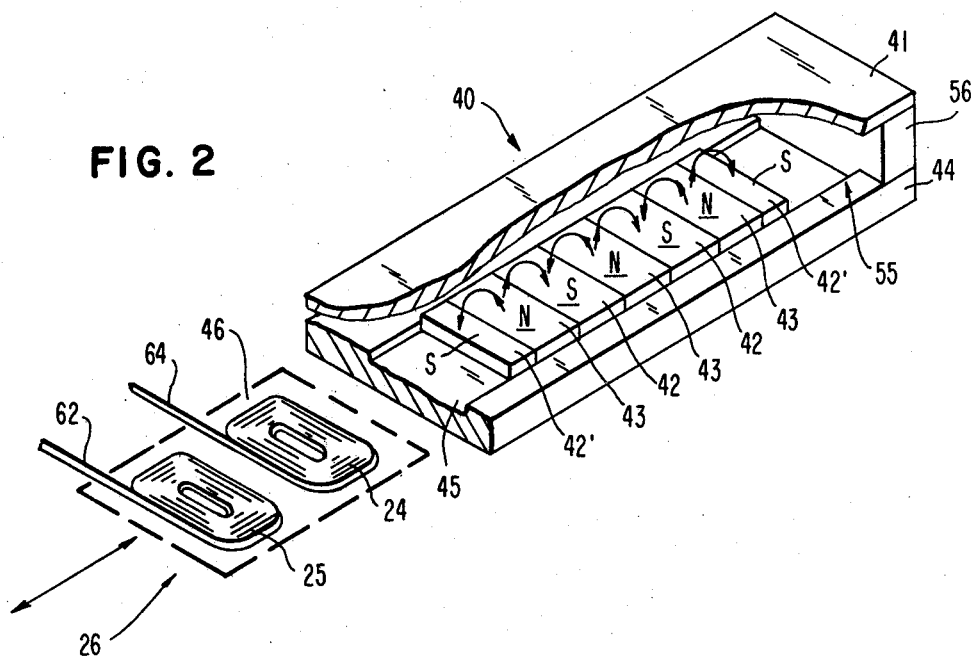
FIG. 2 shows a perspective view of the stator of the actuator of this invention with a portion of the upper shield cut away for convenience of illustration and a small portion of the armature shown in juxtaposition with the stator, but moved to the left of its usual location above the magnets of the stator illustrating an embodiment of this invention.

An actuator embodying this invention in the actuator of FIG. 1 is shown in greater detail in FIG. 2 with the stator 40 including magnetic yokes 41 and 44 and alternating polarity permanent magnets 42 and 43 (S and N respectively) resting in a slot 45 in lower magnetic yoke 44. At the ends of the array of magnets 42 and 43 are the magnetically matched "half poles" (endpoles) 42' which embody the present invention. The series of magnets 42, 43 and 42' is aligned with magnetizations perpendicular to the plane of yoke 44 with alternating poles 42', 43, 42, 43, 42, 43, 42' providing alternating north and south poles for permitting extended linear motion along the stator by armature 26. Extending parallel to lower yoke 44 above the magnets 42', 42 and 43 is the upper yoke 41 which is used for containing the magnetic field within the stator 40 to the degree possible and which provides a low reluctance path for the magnetic field. The armature 26 includes two actuator coils 24 and 25, with connector wires 64 and 62 adapted to fit within the elongated slot-like space 55 within the stator 40 defined by the magnets 42', 43, 42 etc. and the lower yoke 44 below and the upper yoke 41. The coils 24 and 25 are spaced apart in side-by-side relationship by an appropriate distance so that one of the coils when actuated by current in wires 64 and 62 respectively will provide a linear force along the length of the armature 26 on an axis indicated by the double headed arrow (in the lower left of FIG. 2) in a direction determined by the direction of the current in the coil and the direction of the magnetic field (produced by the magnets 42, 42' and 43) at the coil energized. The two coils 24 and 25 are alternately energized as the armature 26 moves along the array of magnets 42', 42, and 43 providing actuation force until the servo system stops it at the commanded location.

Figure 3:
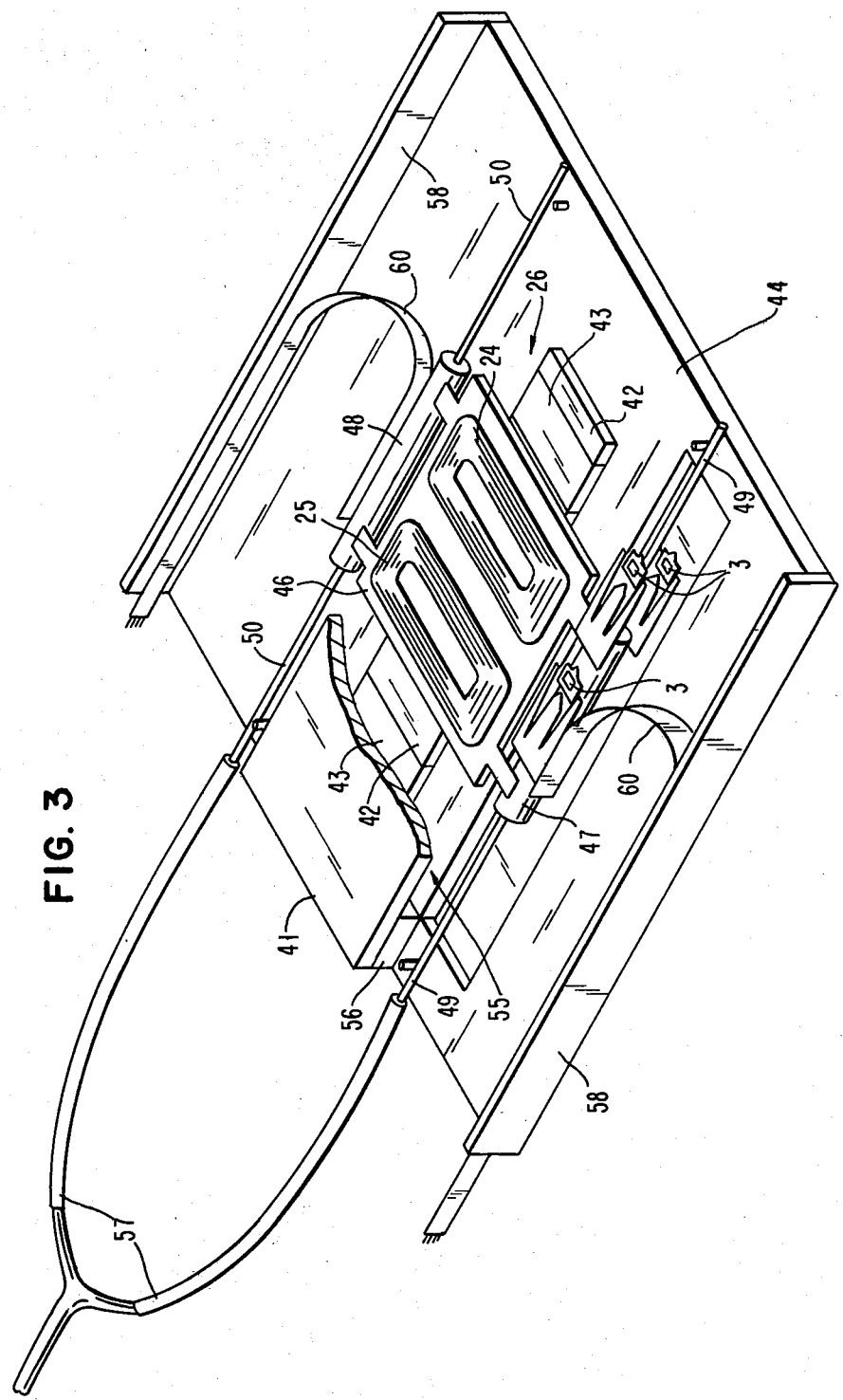
FIG. 3 is a different perspective view of the overall actuator of FIG. 1 shown in greater detail.

FIG. 3 shows a perspective view of the overall actuator system with a portion of the upper yoke 41 cut away to show the armature 26 and the lower yoke 44 and the magnets 42, 43 and 42'. The lower yoke 44 supports the magnetic yoke end pieces 56 which carry the upper magnetic yoke 41. To repeat, the yokes 41 and 44 and the magnetic poles 42, 43, and 42' define the slot-like space 55 housing the armature 26, which shuttles back and forth between the end pieces 56 within space 55. The bearing supporting tubes 49 and 50 are hollow pneumatic tubes supplied with air from lines 57 which are used to support hollow cylindrical pneumatic bearings 47 and 48. The armature carries the magnetic recording head 3' linearly parallel to the tubes 49 and 50. Wiring harness 60 provides electrical connections to the moving armature 26 to supply power to the armature 26 and to connect signals read from the magnetic recording heads to the output of the system. Wiring harness 60 consists of a plastic strip with parallel wires flexibly carried by the armature 26 and supported at the sides of the lower yoke 44 by the side plates 58.

Figure 4:
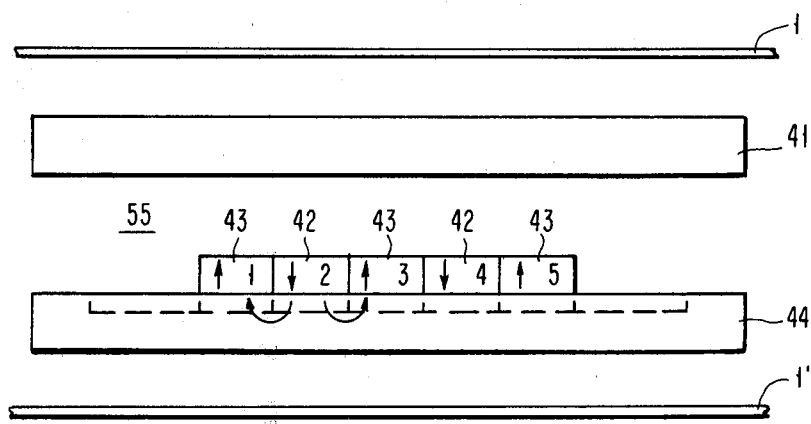
FIG. 4 shows a schematic view of the magnetic structure of the stator of FIGS. 2 and 3 with the "half poles" removed in a side elevation view.

FIG. 4 shows a modified form of the magnetic structure of the stator of the linear motor discussed above in the form of a simple schematic side view of the stator. The two iron plates 41 and 44 and the alternating permanent magnets 42 and 43 are shown as they are in FIGS. 2 and 3 with the end pieces 56 and the end poles 42' eliminated. The alternating magnets 42 and 43 are of equal magnetic strengths, composed of the same material and are of equal sizes. Consider the magnetic flux carried in the iron plates 41 and 44.

Look at what happens to the flux from magnet 2, (in the iron). Half of the flux goes to the right and closes with the magnet 3 and the other half of the flux goes to the left and closes with magnet 1. One can see that in this situation, the iron plate 44, at any one point is required to carry a maximum of $\frac{1}{2}$ of the flux from magnet 2.

Now consider the end magnet 1. Where does its flux close? Half closes with magnet 2 as described above, but what about the other half? In FIG. 4, the flux would have to close with magnet 4 through the lower plate 44. This doubles the magnetic flux density in the iron plate 44. This will tend to increase the magnetic field projected from plate 44 towards disk 1' and will require spacing disk 1' farther away or otherwise constrain the design of the magnetic recording product to be less efficient.

A first solution to the problem of flux leakage tried (shown in FIG. 5) was to provide an iron closure shield 56 at the end of the stator which would provide a return path for the magnetic field which was fringing above and below the stator. The problem was not overcome with that solution because the air gap G required between the two halves of the closure shield 41 and 44 was of such high reluctance in the magnetic circuit that there remained very substantial fringing magnetic fields of the kind which had been sought to be eliminated in the first place. Regardless of the reluctance of the iron (or its equivalent used), the reluctance of the air gap is so great that the stray fields are unacceptable.

Figure 5:
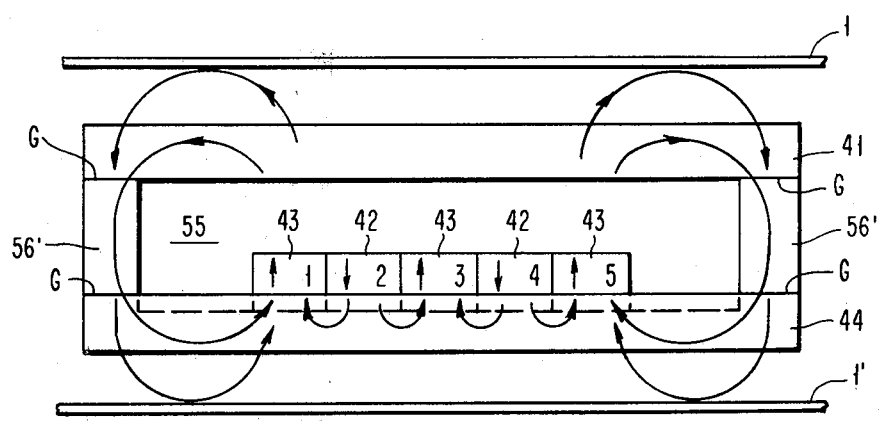
FIG. 5 shows a modification of the structure of FIG. 4 with the addition of iron closure shields at the ends of the yoke structure.

The reason that the solution in FIG. 5 is unacceptable is quite simply the flux lines as shown are long, circuitous and leaky. Leakiness is the problem.

An alternative way to solve the problem is to provide a solid magnetic closure of low reluctance at the ends of the actuator. However, in view of the need to keep the actuator armature free to move at high speed and the fact that the actuator overshoots the end of the stator, the end of the stator must remain open for a significant distance beyond the end of the poles, on the order of one-half inch or more. That is too far unless the structure is absolutely solid and no flux is caused to leak because of the problem of joining iron layers together. A solid structure is not a practical alternative because of fabrication difficulties. The problem is that the flux densities in the iron 41 and 44 and the magnets 42 and 43 are on the order of 6000 gauss whereas a flux density of about 3 to 5 gauss is unacceptable in the environment of the disk. It should be noted that the stators comprise a pair of parallel strips of iron 41 and 44 on the confronting faces of which are secured all the pole magnets 42 and 43 as well as the flux gathering magnets 42' at the ends.

Figure 6:
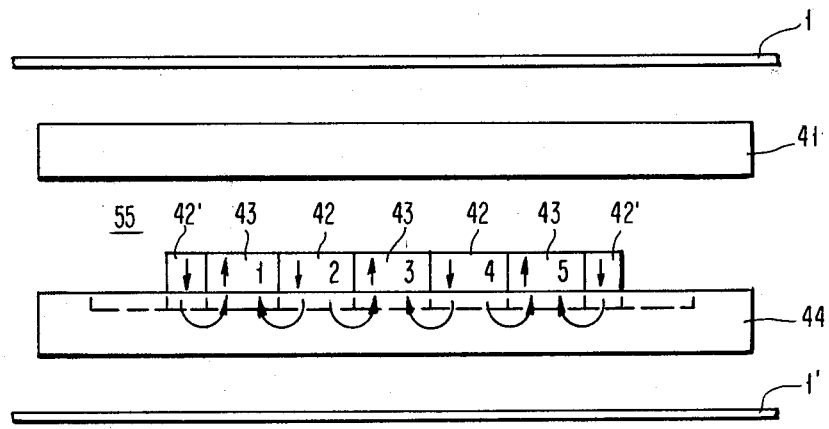
FIG. 6 is a similar view to FIG. 4 of the magnetic structures of FIGS. 1-3 with the "half poles" which are half strength or magnets at the ends of the array of magnetic poles in accordance with this invention.

It has been found as shown in FIG. 6 that the size of the flux gathering magnets 42' must be exactly half of the size of the magnets 42 and 43 used as poles of the motor when all of the magnets are composed of the same material. In any case, it is clear that the flux generated by the flux gathering magnets must be reasonably well matched to the flux which passes from the last magnetic poles in the motor array through the iron backing strip 44 upon which the magnets are secured. In other words, the amount of fringing flux is reduced by balancing the magnetic structure.

The function of the flux gathering magnets 42' is to provide a balancing magnetic field which minimizes the flux concentration in the yoke structure. Note that this increases neither the thickness nor the area of the flux path nor does it reduce the magnetic field.

In FIG. 6 with the half pole magnets 42' added the flux path of all the full size magnets 42 and 43 is identical, i.e. half of the flux closes to the right and half to the left. The end half-pole magnet closes all its flux (half of the flux from a whole magnet) to the adjacent magnet. There is now no magnetic need for the end closures 56' to carry flux and the flux in the lower plate 44 is never greater than $\frac{1}{2}$ flux from a whole magnet 42 and 43. Closures 56 do support the weight of iron yoke 41.

For any design of the linear motor disk head actuator that does not have half-pole magnets, the subsequent addition of half-pole magnets reduces the magnetic flux required to be carried by the top and bottom iron plates 41 and 44 by about a factor of two. In practice, this advantage would probably be utilized during the initial design of the actuator. The reduced magnetic flux in the iron would be traded for reduced iron mass, reduced thickness, reduced stray magnetic field and increased gap field. The corresponding benefits would be lower weight, shorter disk stacks, prevention of disk erasure, and shorter seek times.

I. A Particular Example

One of the first linear motor disk actuators was designed with two 3 mm thick iron plates, 3 mm thick samarium cobalt magnets, and a 1 mm thick air gap. Each magnet was 13 mm wide. The flux from one half of any magnet in the middle of the array is returned through the iron plate to an adjacent magnet. That is, the flux from 6 mm of magnet is returned through 3 mm of iron: there is a concentration of the flux by a factor of two. The measured field in the air gap is about 6,000 gauss, so the field in the iron is about 12,000 gauss. Since this is very good magnetically soft iron with a saturation magnetization of about 20,000 gauss, the iron can easily carry this flux and there is very little stray field outside the structures due to the magnets 42, and 43 in the center of the array.

If half-pole magnets 42' are not used, the situation is very different at the ends of the prototype. The flux from the full width magnets at the ends must be returned through the 3 mm thick iron. If all the field from the 13 mm wide magnets went through the 3 mm thick iron, the iron would be required to carry 24,000 gauss. This is not likely as the saturation magnetization of iron is 20,000 gauss. In reality, some flux is carried through the end closure iron pieces, some flux is carried through the air, and the field in the air gap is reduced so that the flux in the iron stays below 20,000 gauss.

The stray field was measured near the actuator without half-pole magnets. The stray field was about 200 gauss. Changing the number of full width poles 42 and 43 from odd to even changed the distribution of the flux, but the maximum field was still several hundred gauss.

The addition of half-pole magnets 42' at the ends of the magnet array changed the situation. Half the flux from the last full pole magnet 43 returned through the adjacent interior full pole magnet 42 and half the flux is returned through adjacent half-pole magnet 42'. The iron at the ends of the array had to carry only 12,000 gauss, which it could do very easily. The stray field near the actuator with half-pole magnets 42' was measured and shown to be less than 1 gauss.

II. Disk Erasure

When the stray magnetic field from the actuator is too high, the disk is erased by that stray field. For intermediate values of stray field, the parameters for recording on the disk are possibly degraded. Thus the magnitude of the stray field produced by the actuator is very important. A complication is that the recording head acts to concentrate the stray field. Thus a limit for the magnitude of the stray field produced by the actuator must specify the type of recording head used.

The limits for disk erasure can be obtained for different recording heads by intentionally increasing the field until the data recorded on the disk is significantly affected (or the amplitude of the read signal is significantly reduced). These maximum limits vary between 5 and 50 Oe depending on direction, type of recording head and type of air bearing slides. No more than 10 Oe is permitted for thin film heads.

The limit for recording parameter degradation is not so easy to set. This depends on the detailed requirements on the entire recording channel. However, an estimate of the field allowed can be made by measuring the stray fields that exist in present high performance products. This has been done. For the direction that the recording heads are most sensitive, the stray field in a high performance file product is 7 gauss.

The stray field measured in the prototype actuator without half-poles is several hundred gauss (clearly unacceptable). The stray field measured on every actuator made with half-poles was less than 1 gauss (acceptable).

The number of magnets on the stator is not limited to any particular number, or to an odd or an even number of full magnets 42 and 43. In the examples described above, the half size magnets 42' are of the same polarity with one of them at each end of the array of magnets.

An even or an odd number of full magnets can be used with the half width magnets reducing the stray magnetic fields in either case. Possible magnet configurations are depicted in Table 1, below.

TABLE I

| NUMBER OF FALL-WIDTH MAGNETS | ORIENTATION |
| --- | --- |
| 2 | [+][−][+][−] |
| 3 | [+][−][+][−][+] |
| 2N | [+][−]  [+][−] |
| 2N+1 | [+][−]  [−][+] |

Having thus described our invention, what we claim as new, and desire to secure by Letters Patent is:

1. In a magnetic recording disk file including at least one magnetic recording disk, and a magnetic recording head, said head being driven reciprocably generally parallel to said disk from its center to its periphery by a linear actuator having a stator, said stator being located adjacent to the surface of a said disk in said disk file, said stator being constructed of a pair of magnetic yokes comprising parallel plates extending parallel to said disk, with at least one of said yokes carrying an array of regularly spaced and alternating polarity magnetic pole elements including end poles at each end of said stator, the improvement comprising provision at the ends of said array of alternating equal magnetic strength pole elements of said flux gathering end poles composed of permanent magnetic material, said end poles having a flux producing capacity and polarity matched with about half the magnetic capacity of said alternating poles adjacent to said end poles, said end poles serving to collect the return flux from said alternating poles adjacent to said end poles of said stator, whereby fringing magnetic fields extending into the space adjacent to said stator in which said disk files are located is minimized.

2. A disk file in accordance with claim 1, wherein said end poles produce substantially half the quantity of flux of said alternating equal poles.

3. A disk file in accordance with claim 1 wherein said end poles are matched to collect the return flux from the adjacent alternating equal pole, whereby fringing flux which otherwise emanates towards the disk and recording head is reduced.

4. A disk file in accordance with claim 1 wherein said stator is on the order of about 10 mm thick.

5. A disk file in accordance with claim 1, wherein said actuator is adapted to be employed with a stack of at least two disks and said stator is thin enough to be located between a pair of said disks within said stack.

6. In a linear actuator adapted for use with a magnetic recording disk file, said actuator having a stator, said stator being constructed of a pair of magnetic yokes comprising parallel plates, with at least one of said yokes carrying an array of regularly spaced and alternating polarity magnetic pole elements of substantially equal magnetic strength, plus, the improvement comprising provision at the ends of said array of alternating polarity equal magnetic strength pole elements of flux gathering end poles composed of permanent magnetic material, said end poles having a flux producing capacity matched with about half the magnetic capacity of poles adjacent to said end poles, said end poles serving to collect the return flux from said alternating poles adjacent to said end poles of said stator, whereby fringing magnetic fields extending into the space adjacent to said stator is minimized.

7. A linear actuator in accordance with claim 6 wherein said stator is on the order of about 10 mm thick.

8. A disk file in accordance with claim 5 or 6 wherein said end poles produce half the quantity of flux of said alternating poles.

9. A linear actuator in accordance with claim 5 or 6, wherein said end poles are matched to collect the return flux from the adjacent alternating pole, whereby fringing flux which otherwise emanates outside of said stator is reduced.

* * * * *